(12) United States Patent
Wu

(10) Patent No.: US 9,182,542 B2
(45) Date of Patent: Nov. 10, 2015

(54) APPARATUS FOR COMPENSATING IMAGE, DISPLAY DEVICE AND JOINT DISPLAY

(71) Applicant: Ye Xin Technology Consulting Co., Ltd., Hsinchu (TW)

(72) Inventor: I-Wei Wu, Hsinchu (TW)

(73) Assignee: Ye Xin Technology Consulting Co., Ltd., Hsinchu (TW)

( * ) Notice: Subject to any disclaimer, the term of this patent is extended or adjusted under 35 U.S.C. 154(b) by 0 days.

(21) Appl. No.: 14/496,335

(22) Filed: Sep. 25, 2014

(65) Prior Publication Data

US 2015/0093086 A1      Apr. 2, 2015

(30) Foreign Application Priority Data

Sep. 27, 2013   (TW) .............................. 102135210 U

(51) Int. Cl.
    *G02B 6/10* (2006.01)
(52) U.S. Cl.
    CPC ....................... *G02B 6/10* (2013.01)

(58) Field of Classification Search
    CPC ...... G02B 6/122; G02B 6/12007; G02B 6/10; G02B 1/045
    USPC .................................. 385/129, 130, 132, 133
    See application file for complete search history.

(56) References Cited

U.S. PATENT DOCUMENTS

2015/0091833 A1*   4/2015  Wu ............................... 345/173

* cited by examiner

*Primary Examiner* — Jennifer Doan
(74) *Attorney, Agent, or Firm* — Novak Druce Connolly Bove + Quigg LLP

(57) ABSTRACT

The present invention provides an image compensating device for a joint display. The image compensating device includes a light incident surface, a parallel light emitting surface, and a plurality of light guiding channels extending from the light incident surface to the light emitting surface. The light emitting surface of image compensating device is greater than the light incident surface. The section area of each light guiding channel is gradually increased from the light incident surface to the light emitting surface, by which to extend the image provided by the peripheral region of each cell of the joint display and provide a seamless joint image.

18 Claims, 25 Drawing Sheets

APPARATUS FOR COMPENSATING IMAGE, DISPLAY DEVICE AND JOINT DISPLAY

FIELD

The present disclosure relates to an image compensating apparatus, and more particularly, to a joint display with an image compensating apparatus to provide seamless image.

BACKGROUND

As the development of technology, display becomes an indispensable part of most of consumer electronic devices. In some compact designed devices such as mobile phones, displays are required to be brighter, thinner, and narrower boarder to make the display as large as possible. On the other hand, in large-sized display such as TVs or display walls for public information displays larger than 200 inch, narrower boarder or zero boarder technique becomes a must for these kinds of applications because the non-display boarders of two adjacent panels may be too obvious and greatly degrade display quality. Although there must be some limitations to minimize boarders of the display, there is still a need to narrower or eliminate the boarders of two adjacent displays of a joint display wall and improve the display quality thereof.

BRIEF DESCRIPTION OF THE DRAWINGS

Implementations of the present technology will now be described, by way of example only, with reference to the attached figures.

DETAILED DESCRIPTION

Figure 1:
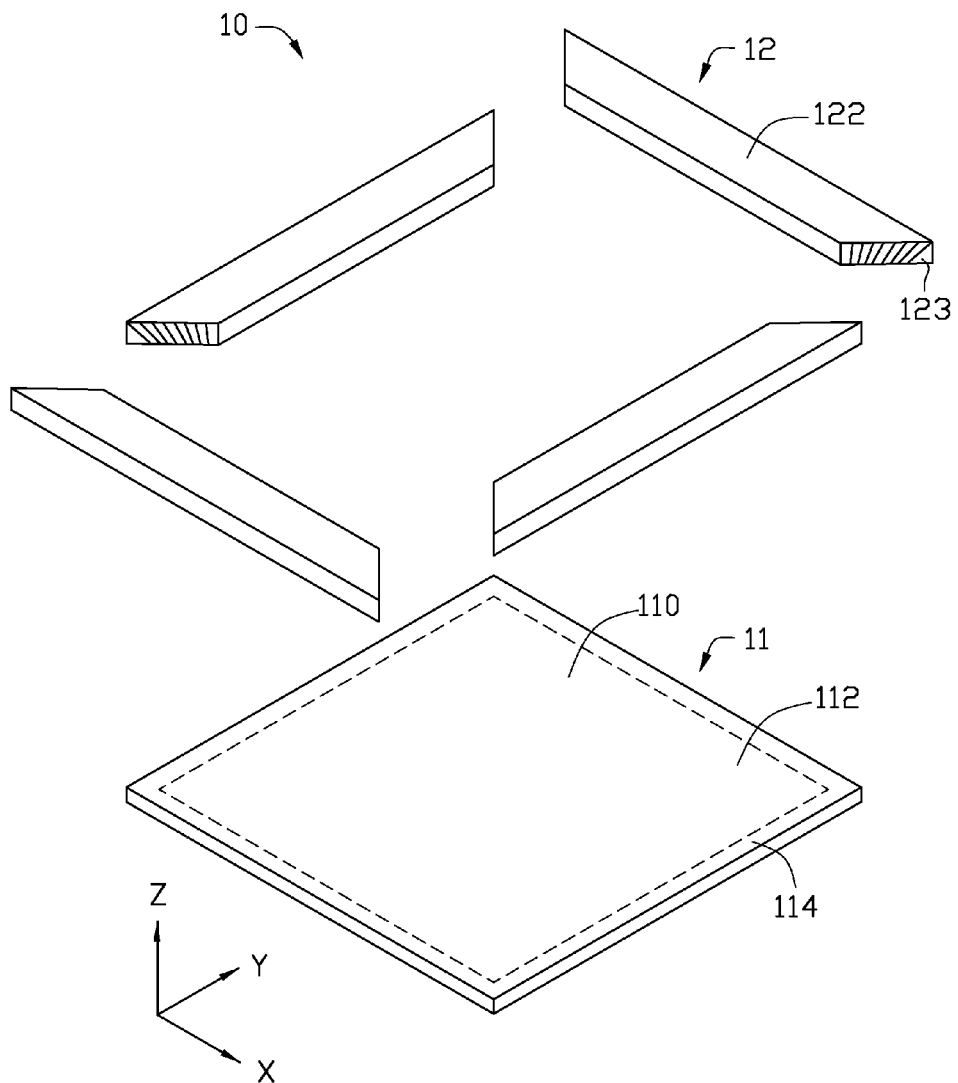
FIG. 1 is an isometric exploded view of a first embodiment of a display device of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

Figure 2:
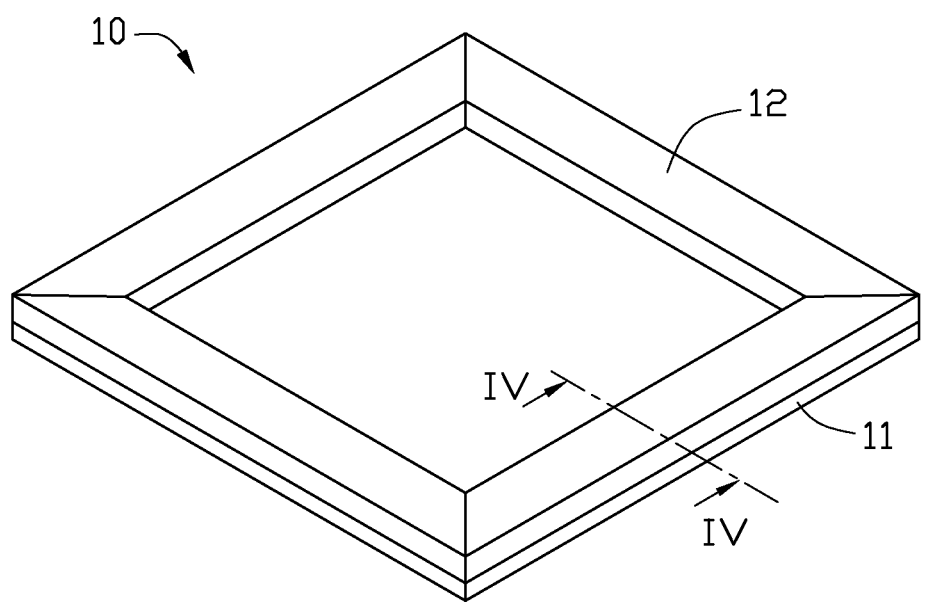
FIG. 2 is an isometric view of the display device of FIG. 1.
Figure 3:
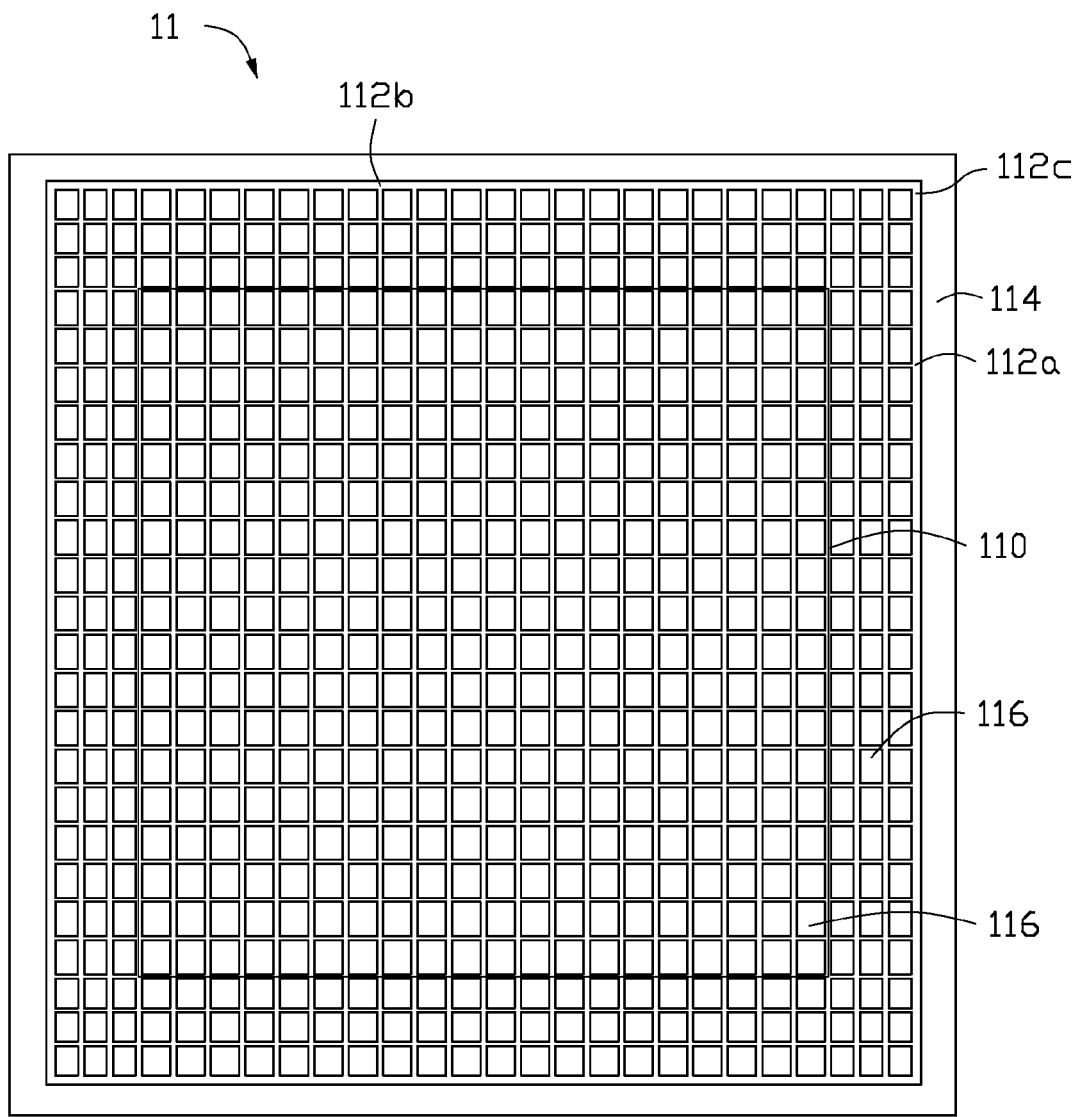
FIG. 3 is a top plan view of the display panel of the display device of FIG. 1.

FIGS. 1 to 4 show a display device 10 of first embodiment of the present invention. FIG. 1 is an isometric exploded view of the display device 10. FIG. 2 is an isometric view of the display device 10. The display device 10 includes a display panel 11 and an image compensation element 12. FIG. 3 is a top plan view of the display panel 11 of the display device 10 of FIG. 2. The display panel 11 includes a main display region 110, a periphery display region 112 represent the outmost part of the main display region 110, and a non-display region 114 located at the outmost one side of the periphery display region 112 away from the main display region 110. The image compensation element 12 disposed upon the display panel 11, which including a plurality of main portions 122 and support portions 123. The main portions 122 and support portions 123 are connected end by end to form a rectangular frame like image compensation element 12 disposed on the peripheral of the display panel 11.

FIG. 3 is a top plan view of the display panel 11 of the display device 10 of FIG. 1. The main display region and the periphery display region include a plurality of pixels 116 arranged in matrix. The pixels 116 in the main display region 110 are evenly arranged with same size. The density of the pixels 116 in the main display region 110, however, is smaller than a density of the pixels 116 in the periphery display region 112. In detail, the space between each two adjacent pixels 116 in the main display region 110 is substantially equal to or larger than a space between each two adjacent pixels 116 in the periphery display region 112. The length of the pixels 116 in the periphery display region 112 is smaller than the length of the pixel 116 in the main display region 110, or the width of the pixels 116 in the periphery display region 112 is smaller than the width of the pixels 116 in the main display region 110. As a consequence, the size of the pixels 116 in the periphery display region 112 is smaller than the size of the pixels 116 in the main display region 110. Wherein the length of a pixel 116 means the length of the pixel 116 measured along a Y-axis, and the width of a pixel 116 means the length of the pixel 116 measured along X-axis.

In the embodiment, the lengths of the pixels 116 in the left side and right side of the periphery display region 112a are equal to the lengths of the pixels 116 in the main display region 110. The widths of the pixels 116 in the left side and right side of the periphery display region 112a are equal, but the widths of the pixels 116 in the left side and right side of the periphery display region 112a are smaller than the widths of the pixels 116 in the main display region 110 respectively. Moreover, the widths of the pixels 116 in the upper side and lower side of the periphery display region 112b are equal to the widths of the pixels 116 in the main display region 110. The widths of the pixels 116 in the upper side and lower side of the periphery display region 112b are equal, but the widths of the pixels 116 in the upper side and lower side of the periphery display region 112b are smaller than the widths of the pixels 116 in the main display region 110 respectively.

Furthermore, the lengths of the pixels 116 in the four corner regions of the periphery display region 112c are smaller than the lengths of the pixels 116 in the main display region 110 respectively, and the widths of the pixels 116 in the four corner regions of the periphery display region 112c are smaller than the widths of the pixels 116 in the main display region 110 respectively. In detail, the lengths of the pixels 116 in the four corner regions of the periphery display region 112c are equal to the lengths of the pixels 116 in the upper side and lower side of the periphery display region 112b, and the widths of the pixels 116 in the four corner regions of the periphery display region 112c are equal to the widths of the pixels 116 in the left side and right side of the periphery display region 112a.

Figure 4:
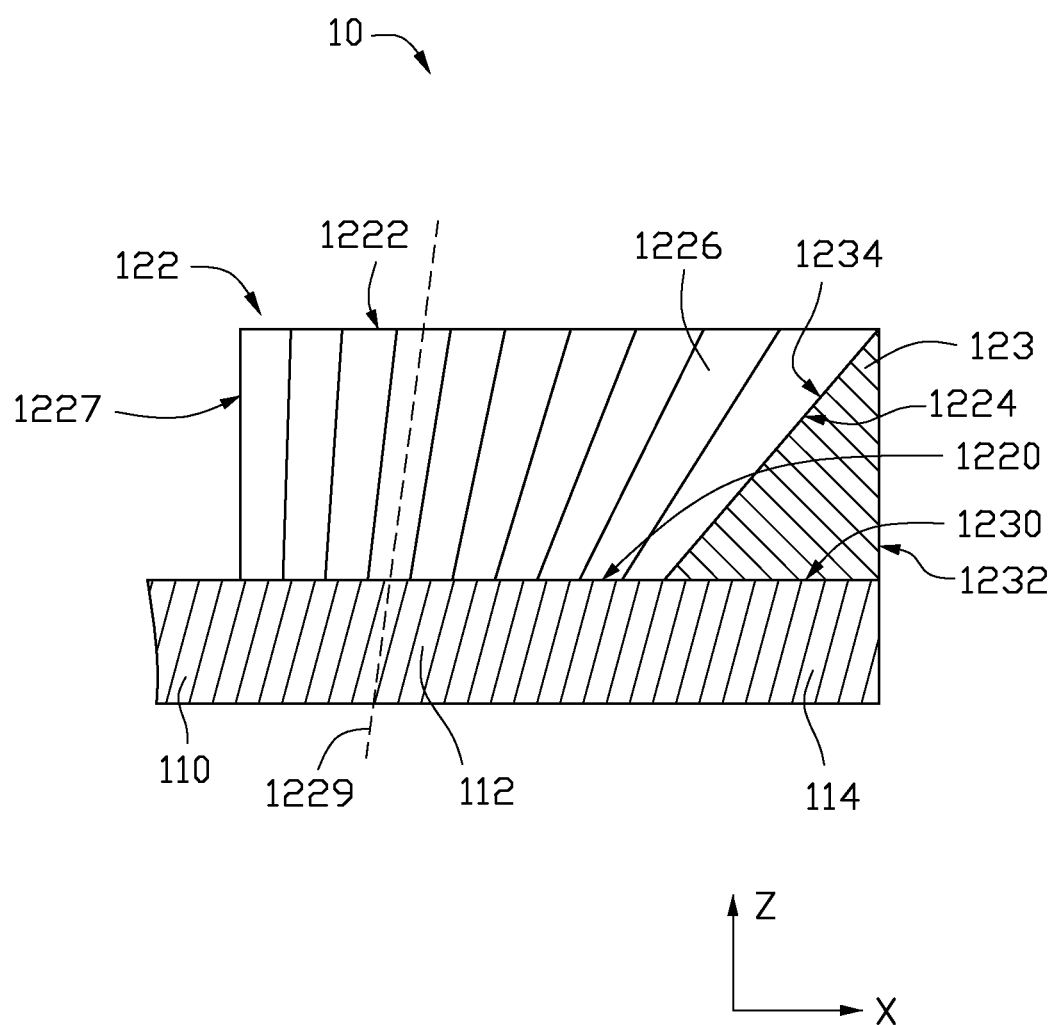
FIG. 4 is a cross sectional view taken along IV-IV line of FIG. 2.

FIG. 4 is a cross sectional view taken along IV-IV line of FIG. 2. The main portion 122 corresponding to the periphery display region 112, and expands the image of the periphery display region 112 to one side of the periphery display region 112 away from the main display region 110. The support portion 123 corresponding to the non-display region 114, and supports the main portion 122. The main portion 122 expands the image of the periphery display region 112 to upper region of the periphery display region 112 and the non-display region 114.

In this embodiment, a cross section of the main portion 122 is a trapezoid, and which includes a light incident surface 1220, a light emitting surface 1222 parallel to the light incident surface 1220, an inclined surface 1224 contacting the support portion 123 and interconnecting the light incident surface 1220 and the light emitting surface 1222, a connecting surface 1227 opposite to the inclined surface 1224 and perpendicular to the light incident surface 1220 and the light emitting surface 1222, a plurality of light guiding channels 1226, and a central axis 1229 of each of the light guiding channels 1226. Wherein the light incident surface 1220 corresponding to the periphery display region 112. The inclined surface 1224 located at one side of the main portion 122 away from the main display region 110. An included angle between the inclined surface 1224 and the light incident surface 1220 is an obtuse angle. The obtuse angle is preferred between 130 degrees to 150 degrees.

The plurality of light guiding channels 1226 independent from each other and extends from the light incident surface 1220 to the light emitting surface 1222. A projection of the light emitting surface 1222 to the light incident surface 1220 is larger than the area of the light incident surface 1220, and a section area of each light guiding channel 1226 gradually increases from the light incident surface 1224 to the light emitting surface 1222, such that a light beam introduced into each of the light guiding channels 1226 is expanded and transmitted from the light incident surface 1220 to the light emitting surface 1222. The projection of the light emitting surface 1222 to the light incident surface 1220 cover the periphery display region 112 and the non-display region 114, and therefore the main portion 122 expands the image of the periphery display region 112.

Furthermore, a cross section of the support portion 123 is a right triangle. The support portion 123 includes a bottom side 1230 corresponding to the non-display region 114, a first side 1232 perpendicular to the bottom side 1230, and second side 1234 connecting between the bottom side 1230 and the first side 1232. The second side 1234 of the support portion 123 overlapping the inclined surface of the main portion 122. In detail, the second side 1234 of the support portion 123 may attach to the inclined surface of the main portion 122 by glue. The material of the support portion 123 may compose of transparent material, opaque metal, or opaque plastic material.

A angle between an extending direction of the plurality of the light guiding channels and the light incident surface is between 30 degrees to 90 degrees, and a range of an angle between an extending direction of the plurality of the light guiding fibers 1228 and the light incident surface 1220 is gradually increasing from the inclined surface 1224 of the main portion 122 to the connecting surface 1227 of the main portion 122 (for example, gradually increased from 30 degrees to 90 degrees). In detail, the angel between the extending direction of the closest to the connecting surface 1227 of the light guiding channel 1226 and the light incident surface 1220 is 90 degrees, and the angel between the extending direction of the closest to the inclined surface 1224 of the light guiding channel 1226 and the light incident surface 1220 is 30 degrees. The extending direction of the light guiding channel 1226 is the extending direction of the central axis 1229 of each of the light guiding channels 1226.

Figure 5:
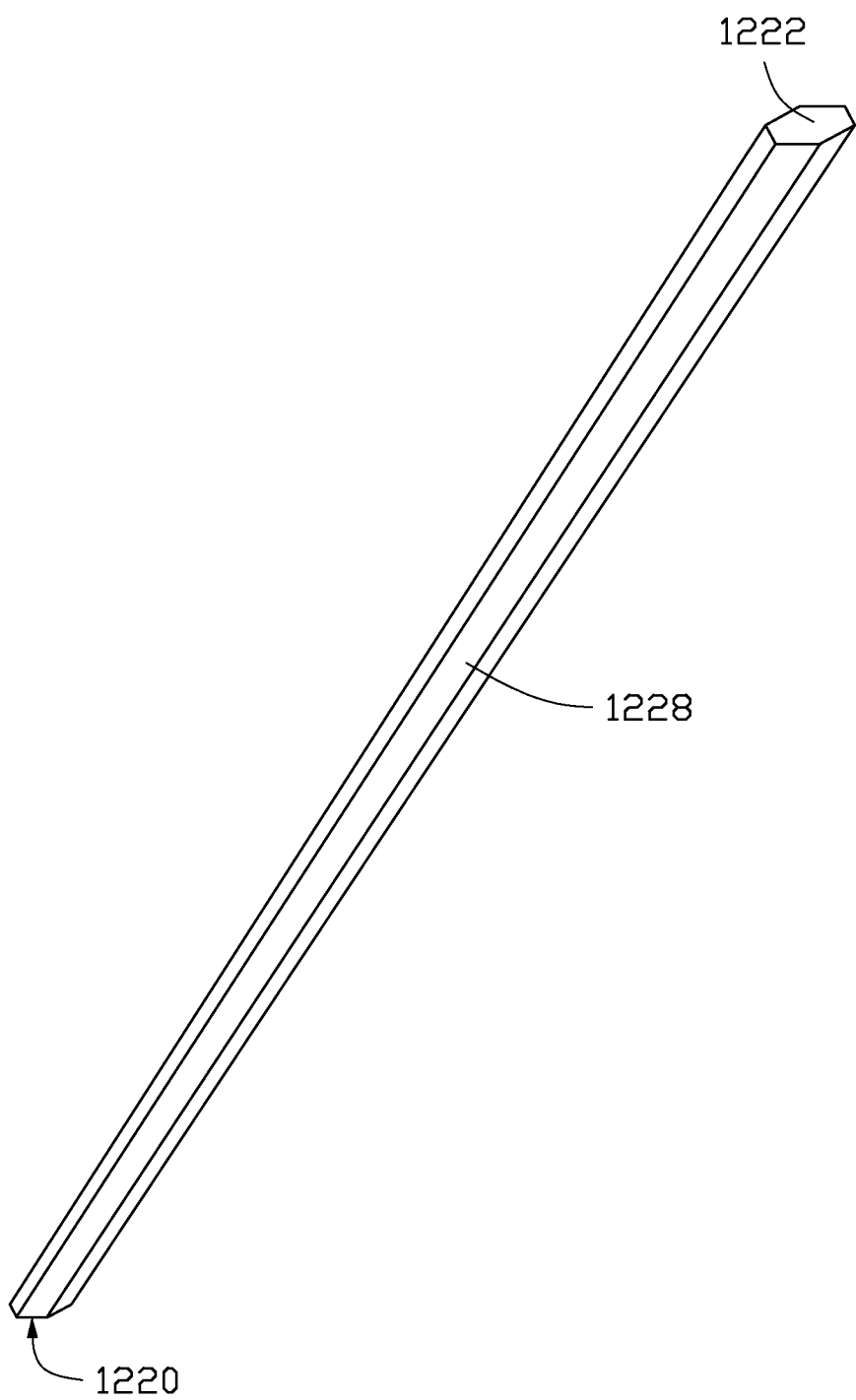
FIG. 5 is an isometric view of a light guiding fiber.

FIG. 5 is an isometric view of a light guiding fiber 1228. In this embodiment, the light guiding channels 1226 may be constructed by the light guiding fibers 1228. Each of the light guiding fibers 1228 extends from a light incident surface 1220 to a light emitting surface 1222, and a section area of each light guiding fiber 1228 gradually increases from the light incident surface 1220 to the light emitting surface 1222. Therefore, an area of the light emitting surface 1222 is greater than an area of the light incident surface 1220. In this way, an amplifying ratio of the light guiding fiber 1228 is determined by a ratio of the area of the light guiding fiber 1228 on the light emitting surface 1222 to the area of the light guiding fiber 1228 on the light incident surface 1220. The light guiding channels 1228 are combined with a number of light guiding thin plates, silica fibers, glass fibers, or the other light penetrating material.

The area of the light emitting surface 1222 of the light guiding fiber 1228 is greater than the area of the light incident surface 1220 of the light guiding fiber 1228. Preferably, a ratio of the area of the light emitting surface 1222 of the light guiding fiber 1228 to the area of the light incident surface 1220 of the light guiding fiber 1228 is between 1.69 and 4. A ratio of a diameter of the light guiding fiber 1228 on the light emitting surface 1222 to a diameter of the light guiding fiber 1228 on the light incident surface 1220 is between 1.3 and 2. An amplifying ratio of the image from the light incident surface 1220 of the light guiding fiber 1228 to the light emitting surface 1222 of the light guiding fiber 1228 is determined by the ratio of the area of the light guiding fiber 1228 on the light emitting surface 1222 to the area of the light guiding fiber 1228 on the light incident surface 1220. The diameter of the light guiding fiber 1228 on the light emitting surface 1222 and the diameter of the light guiding fiber 1228 on the light incident surface 1220 are the diameter of light guiding fiber 1228 along the X-axis.

Furthermore, in the embodiment, the diameter of each of the light guiding fibers 1228 on the light emitting surface 1222 is substantially equal to the diameter of the each of the light guiding fibers 1228 on the light incident surface 1220, so the amplifying ratio of the images are substantially equal to each other. The size of the compensating portion 122 and the support portion 123 may be adjusted according to a requirement of the display panel 11. The size of the compensating portion 122 and the support portion 123 are mainly determined by a size of the non-display region 114 of the display panel 11.

Specifically, a light from the periphery display region 112 enters the main portion 122 of the image compensation element 12 from the light incident surface 1220 and emits out of the main portion 122 of the image compensation element 12 from the light emitting surface 1222 by passing through the light guiding channels 1226. Thus, the image expands on the light emitting surface 1222 cover the periphery display region 112 and the non-display region 114. The non-display region 114 is invisible to a viewer, and the display device 10 has a frame-less effect. In this way, images of pixels 116 in the periphery display region 112 and amplified by the corresponding light guiding channels 1226 are substantially equal to each other and equal to images of the pixels 116 in the main display region 110.

Figure 6:
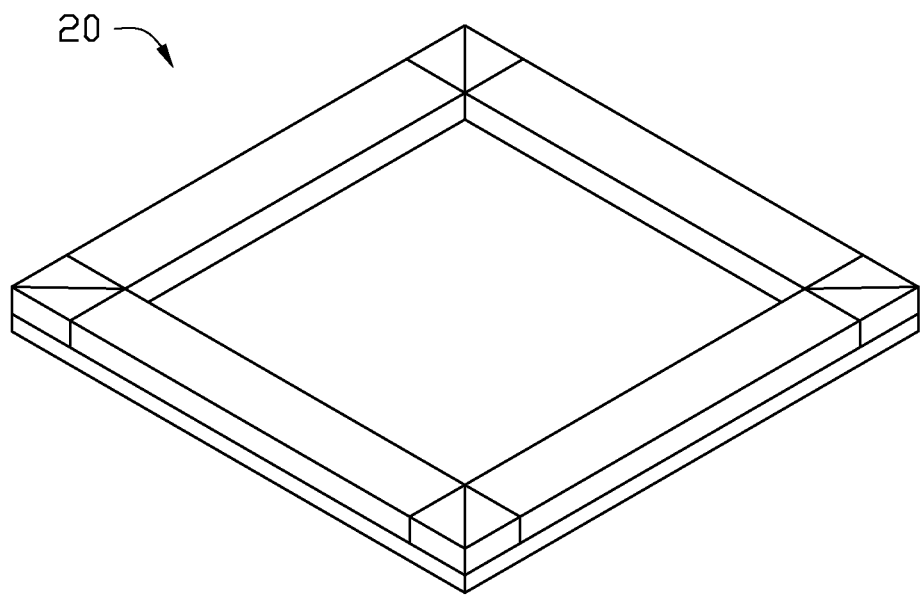
FIG. 6 is an isometric view of a second embodiment of a display device of the present disclosure.
Figure 7:
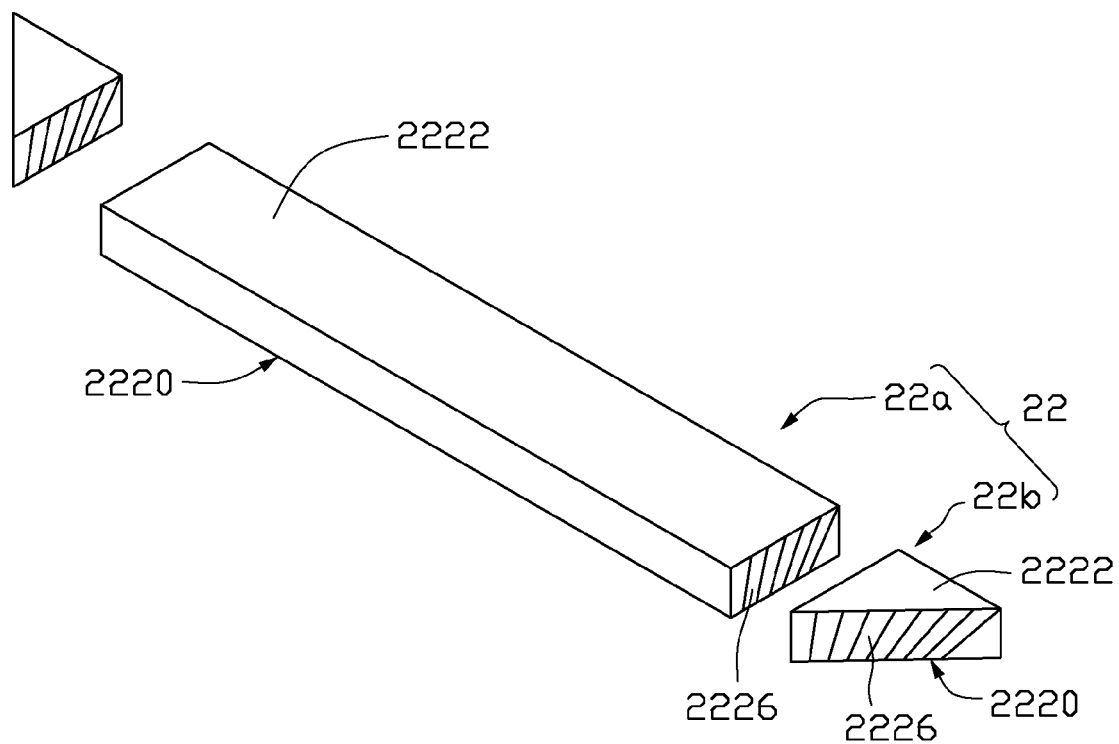
FIG. 7 is an isometric exploded view of an image compensation element of the display device of FIG. 6.
Figure 8:
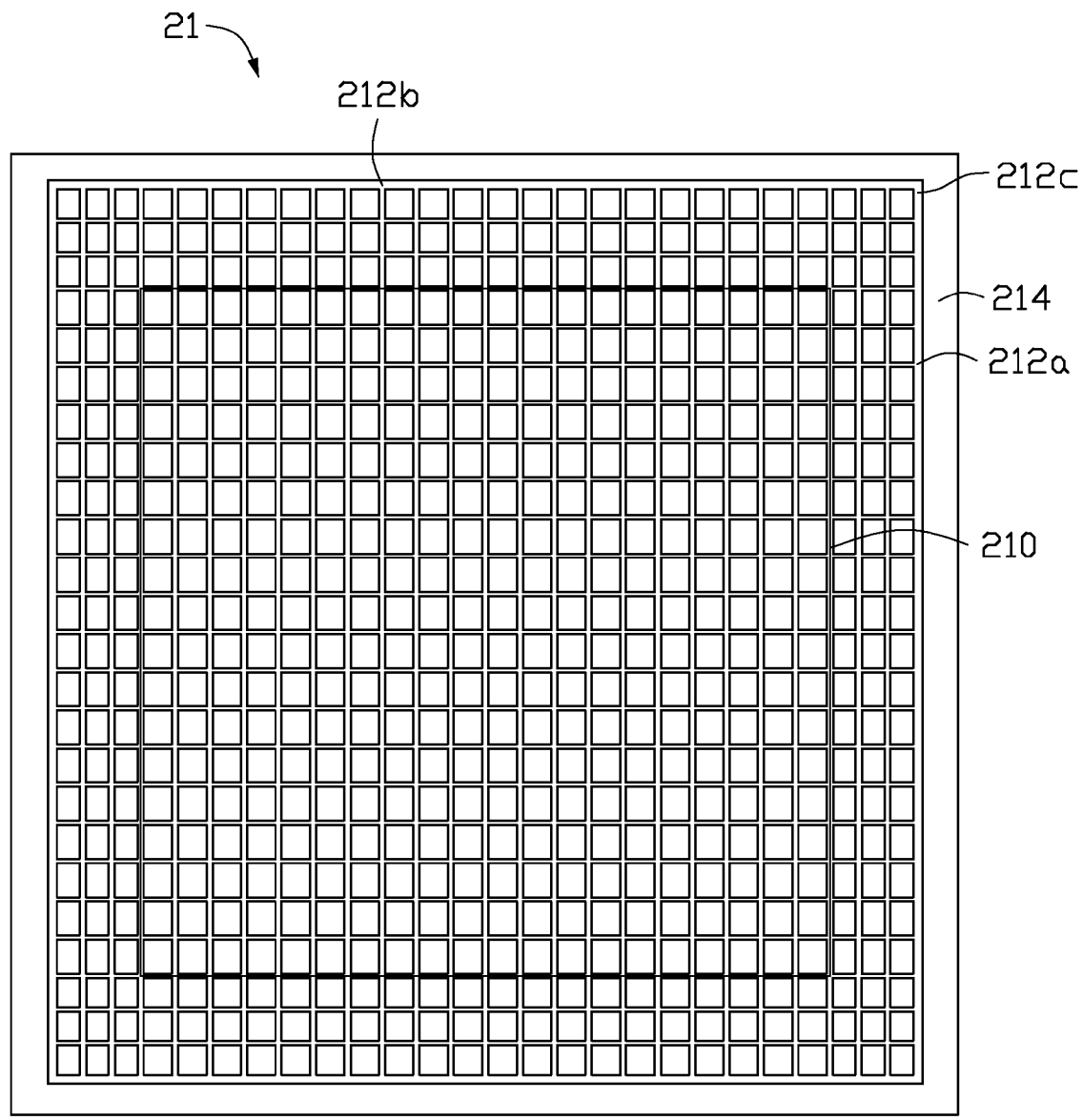
FIG. 8 is a top plan view of a display panel of the display device of FIG. 6.
Figure 8:
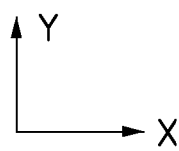

FIGS. 6 through 8 show a display device 20 of a second embodiment. FIG. 6 is an isometric view of the display device 20. FIG. 7 is an isometric exploded view of an image compensation element 22 of the display device 20 of FIG. 6. FIG. 8 is a top plan view of a display panel 21 of the display device 20 of FIG. 6. The display device 20 is similar to the display device 10 of the first embodiment. A difference between the image compensation element 22 of the second embodiment and the image compensation element 12 of the first embodiment is that the image compensation element 22 including four strip image compensation elements 22a and four corner image compensation elements 22b. A difference between the periphery display region 212 of the second embodiment and the periphery display region 112 of the first embodiment is that the periphery display region 212 including two strip display regions 212a at two side of the main display region 210 along the X-axis, two strip display regions 212b at two side of the main display region 210 along the Y-axis, and four corner display regions at four corners of the periphery display region 212. The four strip image compensation elements 22a individually corresponding to the four strip display regions 212a and 212b, and the four corner image compensation elements 22b individually corresponding to the four corner display regions 212c.

In this embodiment, both ends of each of the strip image compensation elements 22a have a corner image compensation element 22b individually. A light emitting surface 2222 and a light incident surface 2220 of each of the strip image compensation elements 22a are substantially rectangular. The light emitting surface 2222 and the light incident surface 2220 of each of the corner image compensation elements are substantially right triangle.

Furthermore, an image of each of the strip display regions 212a and 212b is amplified in a widthwise by the elongated side image compensation elements 22a, and the strip image compensation elements 22a expands the images of the strip display regions 212a and 212b to the non-display region 214. an image of each of the corner display regions 212c is amplified in a widthwise direction and in a lengthwise direction by the corner image compensation element 22b, and the corner image compensation elements 22b expands the images of the corner display regions 212a and 212b to the corner regions of the non-display region 214. Ann amplifying ratio of the corner image compensation element 22b is greater than the amplifying ratio of the strip image compensation element 22a. A ratio of the area of the light guiding channel 2226 of the corner image compensation element 22b on the light emitting surface 2222 to the area of the light guiding channel 2226 of the corner image compensation element 22b on the light incident surface 2220 is greater than a ratio of the area of the light guiding channel 2226 of the strip image compensation element 22a on the light emitting surface 2222 to the area of the light guiding channel 2226 of the strip image compensation element 22a on the light incident surface 2220. In detail, the area of the light guiding channel 2226 of the corner image compensation element 22b on the light emitting surface 2222 is greater than the area of the light guiding channel 2226 of the strip image compensation element 22a on the light emitting surface 2222 when the area of the light guiding channel 2226 of the corner image compensation element 22b on the light incident surface 2220 the same as the area of the light guiding channel 2226 of the strip image compensation element 22a on the light incident surface 2220.

The four strip image compensation elements 22a and four corner image compensation elements 22b are connected end to end to form a rectangular frame. The image compensation element 22 is positioned out of the main display region 210 and expands the image of the periphery display region 212. The corner image compensation element 22b and the strip compensation element 22a have different amplifying effect so that the image of each pixel of the corner display regions 212c after being amplified by the corner image compensation element 22b is substantially equal to an image of each pixel of the strip display regions 212a and 212b after being amplified by the strip image compensation element 22a. Therefore, a display effect of the display device 20 is better than a display effect of the display device 10 of the first embodiment.

Figure 9:
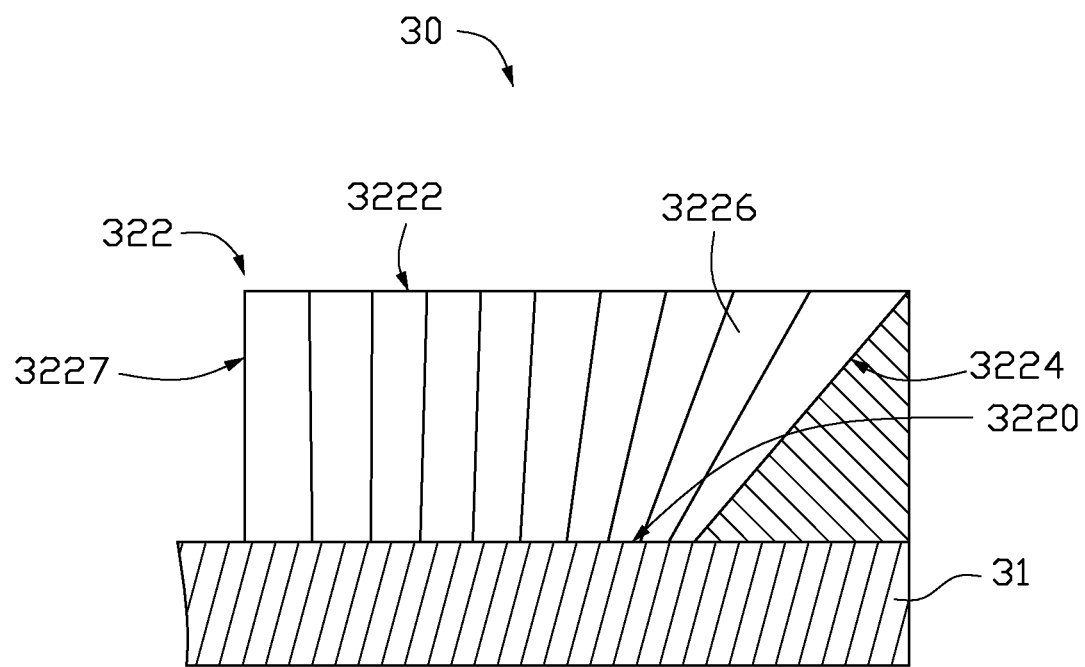
FIG. 9 is a cross sectional view of a third embodiment of a display device of the present disclosure.
Figure 10:
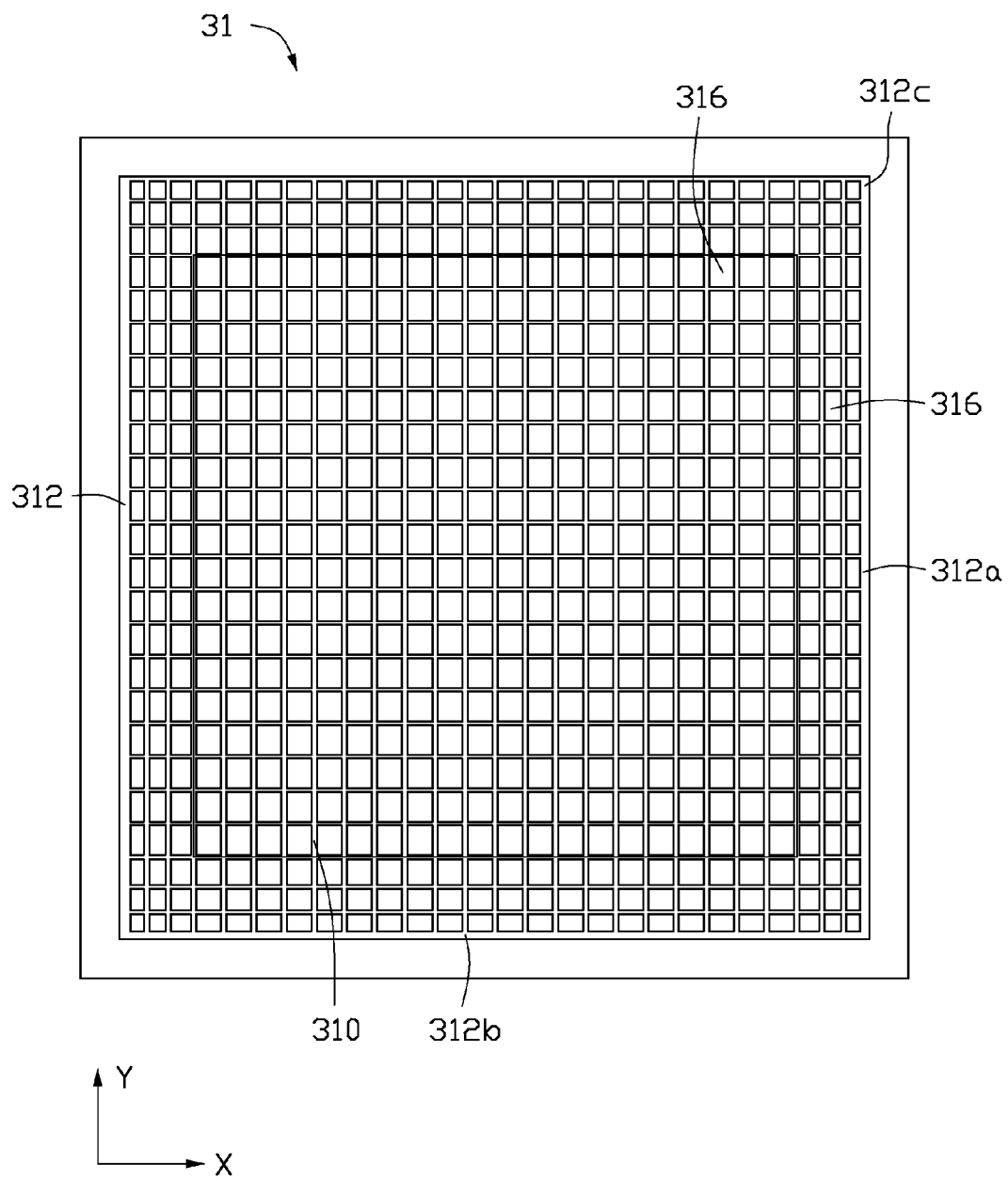
FIG. 10 is a top plan view of a display panel of the display device of FIG. 9.

FIG. 9 and FIG. 10 show a display device 30 of a third embodiment. FIG. 9 is a cross sectional view of a display device 30. FIG. 10 is a top plan view of a display panel 31 of the display device 30 of FIG. 9. The display device 30 is similar to the display device 10 of the first embodiment. A difference between a main portion 322 and the main portion 122 of the first embodiment is that a ratio of the area of a light guiding channels 3226 on a light emitting surface 3222 to the area of the light guiding channel 3226 on the light incident surface 3220 increases along a direction from the connecting surface 3227 to the inclined surface 3224. A size of the pixels 316 in the periphery display region 312 decreases along a direction away from the main display region 310. Such as, area of the plurality of the light guiding channels 3226 on the light emitting surface 3222 are equal to each other but area of the plurality of the light guiding channels 3222 on the light incident surface 3220 are decrease along a direction from the connecting surface 3227 to the inclined surface 3224.

A size of the pixels 316 and a space between adjacent pixels 316 are equal to each other in the main display region 310. A density of the pixels 316 in the main display region 310 (per unit area) is smaller than a density of the pixels 316 in the periphery display region 312. In detail, a space between adjacent pixels 316 in the main display region 310 is substantially equal or bigger than a space between adjacent pixels 316 in the periphery display region 312, and sizes of the pixels 316 in the periphery display region 312 is smaller than sizes of the pixels 316 in the main display region 310. Such as, lengths of the pixels 316 in the periphery display region 312 is smaller than lengths of the pixels 316 in the main display region 310, or widths of the pixels 316 in the periphery display region 312 is smaller than widths of the pixels 316 in the main display region 310. In this embodiment, widths of the pixels 316 at the two sides of the periphery display region along the X-axis is smaller than widths of the pixels 316 in the main display region 310, and lengths of the pixels 316 at the two sides of the periphery display region 312 along the Y-axis is smaller than widths of the pixels 316 in the main display region 310. Lengths and widths of the pixels 316 in the corner display region 312c of the periphery display region 312 are smaller than lengths and widths of the pixels 316 in the main display region 310. Wherein a length of a pixel 316 is a length of the pixel 316 along a Y-axis, and a width of the pixel 316 is a width of the pixel 316 along the X-axis.

Furthermore, the density of the pixels 316 in the periphery display region 312 increase along a direction away from the main display region 310. For example, a density of the pixels 316 in the periphery display region 312 at the right side of FIG. 10 increases along a positive X-axis, a density of the pixels 316 in the periphery display region 312 at the upper side of FIG. 10 increases along a positive Y-axis, densities of the pixels 316 in the periphery display region 312 at the left side and at the right side of FIG. 10 are axial symmetrical, and densities of the pixels 316 in the periphery display region 312 at the upper side and at the bottom side of FIG. 10 are axial symmetrical. In detail, spaces between adjacent pixels 316 in the periphery display region 312 decreases along a direction away from the main display region 310. Widths of the pixels 316 at the left side and at the right side of the periphery display region 312 decrease along an X-axis away from the main display region 310, and lengths of the pixels 316 at the upper side and at the bottom side of the periphery display region 312 decrease along a Y-axis away from the main display region 310. Lengths and widths of the pixels 316 in the corner display region 312c of the periphery display region 312 decrease along a direction away from the main display region 310.

In this embodiment, size of the pixels 316 in the periphery display region 312 decreases along a direction away from the main display region 310. A ratio of the areas of the light guiding channels 3226 of the main portion 322 on the light emitting surface 3222 to the area of the light guiding channels 3226 on the light incident surface 3220 increase along a direction from the connecting surface 3227 to the inclined surface 3224. The main portion 322 amplifies the image of the pixels 316 in the periphery display region 312 to make an image of each pixel 316 in the periphery display region 312 is substantially equal to an image of each pixel 316 in the main display region 310 in size.

Figure 11:
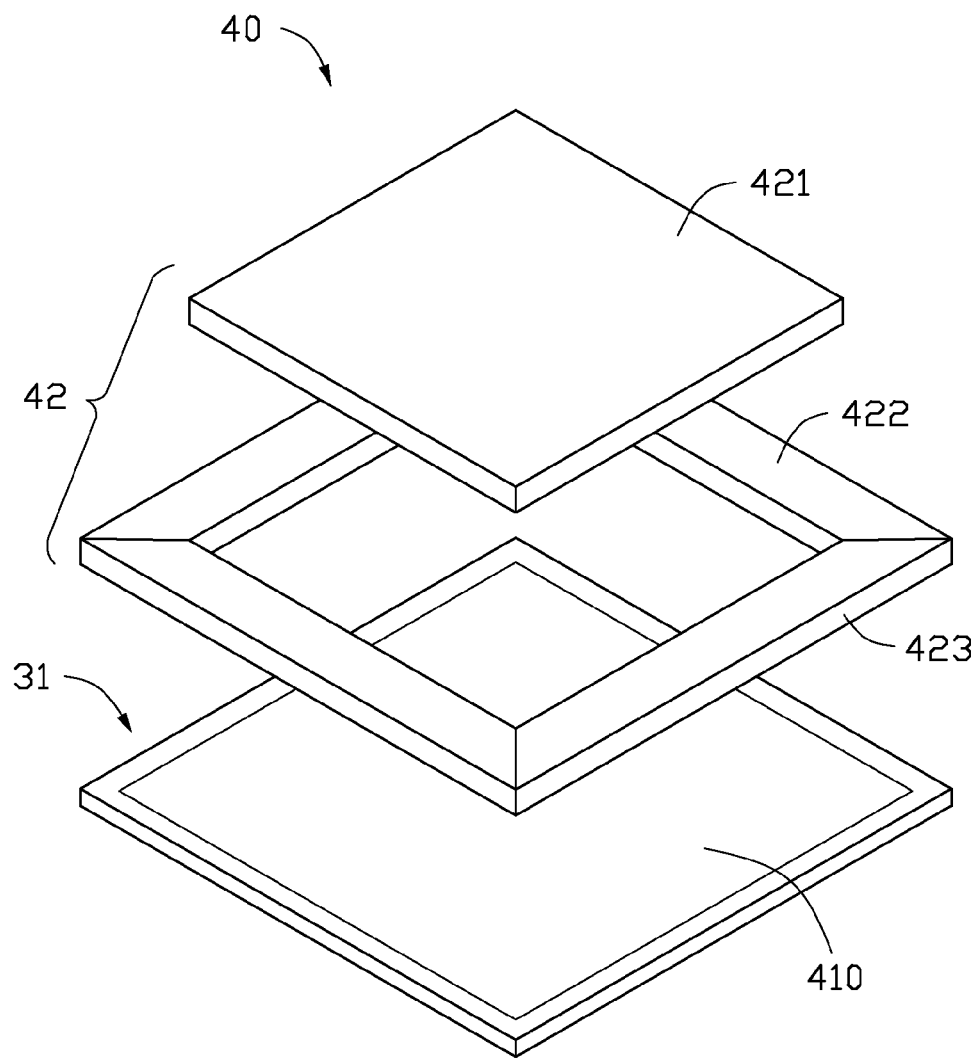
FIG. 11 is an isometric exploded view of a fourth embodiment of a display device of the present disclosure.
Figure 12:
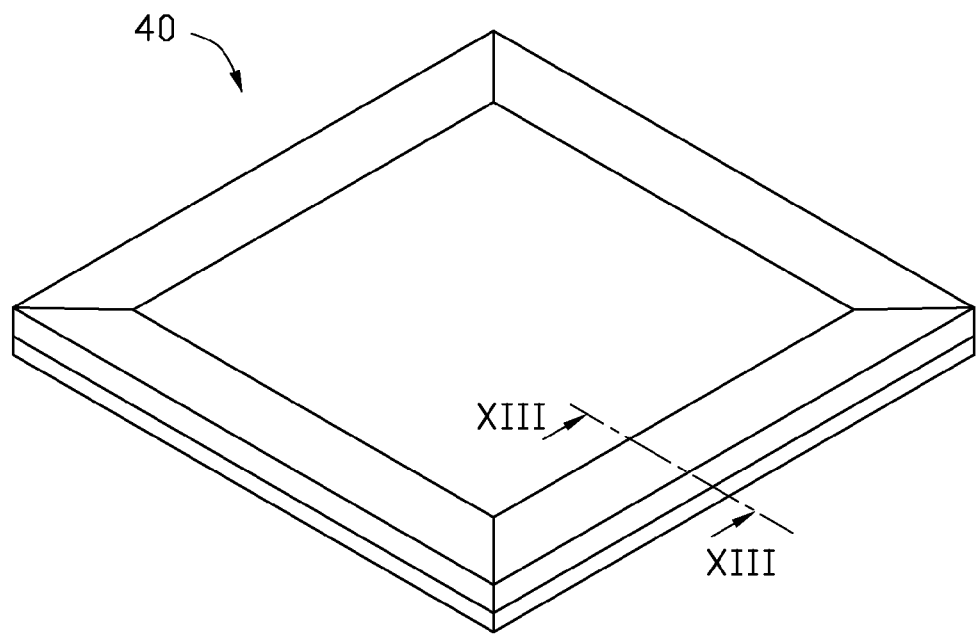
FIG. 12 is an isometric view of the display device of FIG. 11.
Figure 13:
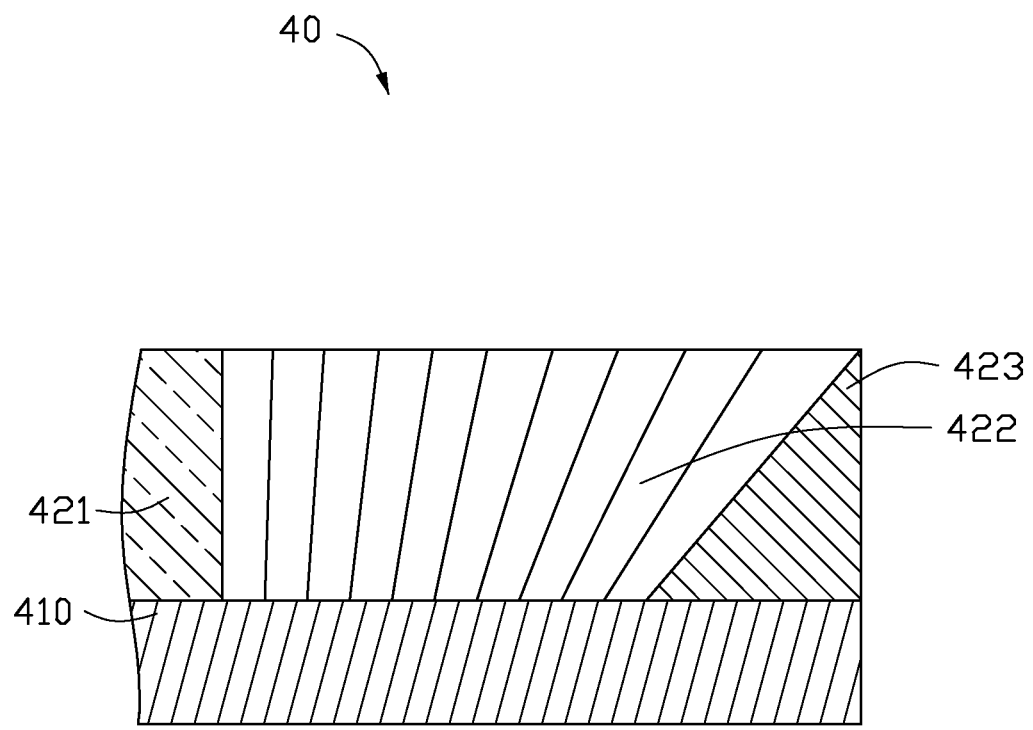
FIG. 13 is a cross sectional view taken along XIII-XIII line of FIG. 12.

FIGS. 11 through 13 show a display device 40 of a fourth embodiment. FIG. 11 is an isometric exploded view of the display device 40. FIG. 12 is an isometric view of the display device 40 of FIG. 11. FIG. 13 is a cross sectional view taken along XIII-XIII line of FIG. 12. A different between the display device 40 and the display device 10 of the first embodiment is that the display device 40 including a transmission portion 421 corresponding to a main display region 410, a main portion 422 located at one side of the transmission portion 421 and connecting the transmission portion 421 and supporting by a support portion 423. The main portion 422, the support portion 423 and the transmission portion 421 are joined together to form a flat cover plate covering the display panel 31. A material of the transmission portion 421 can be a transparent glass or a transparent resin.

Figure 14:
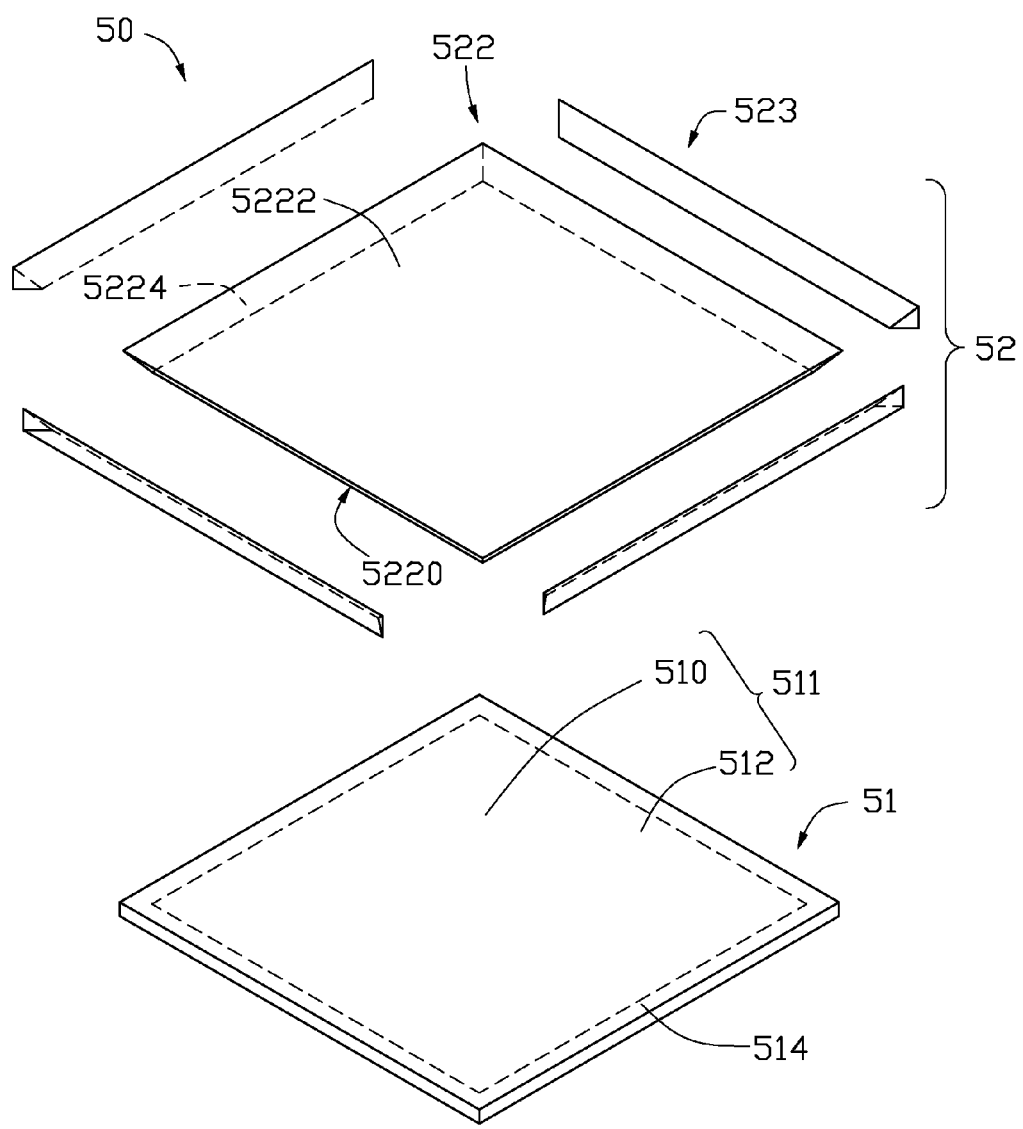
FIG. 14 is an isometric exploded view of a fifth embodiment of a display device of the present disclosure.
Figure 15:
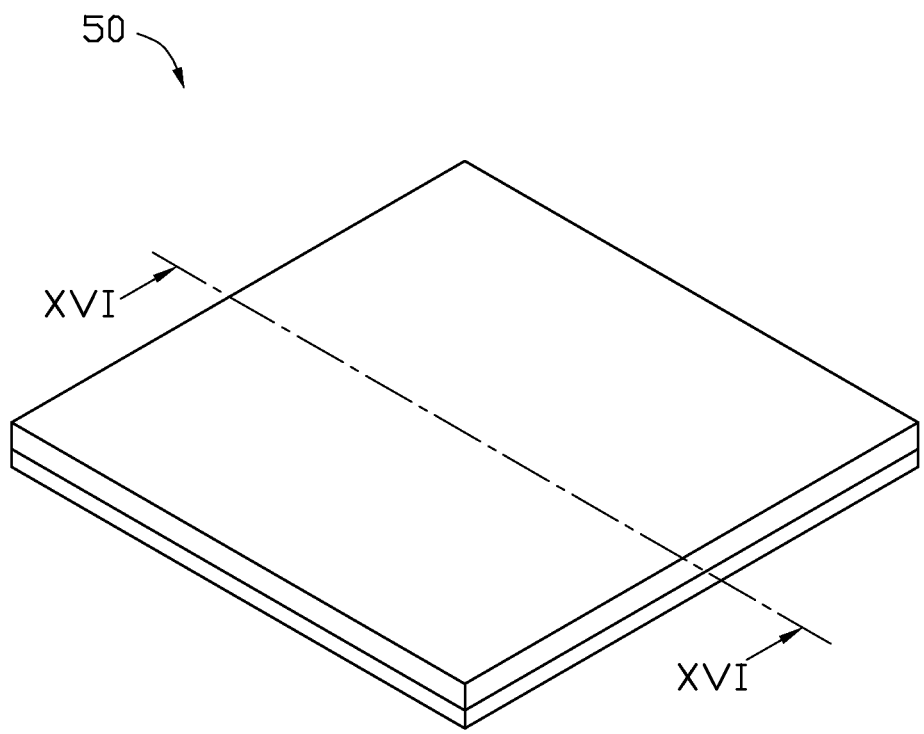
FIG. 15 is an isometric view of the display device of FIG. 14.
Figure 16:
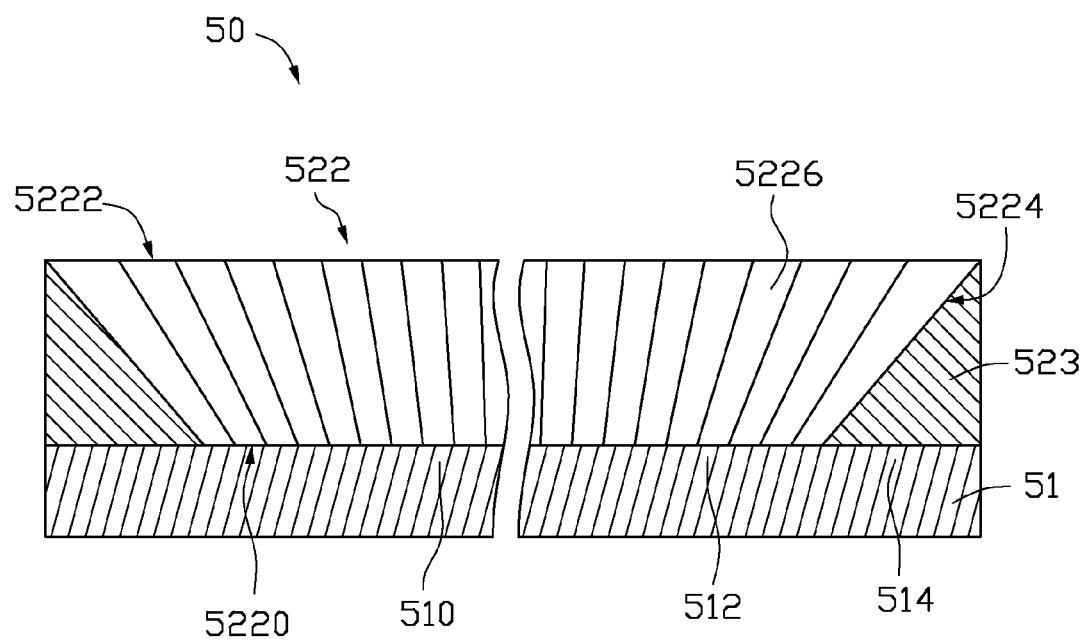
FIG. 16 is a cross sectional view taken along XVI-XVI line of FIG. 15.

FIGS. 14 through 16 show a display device 50 of a fifth embodiment. FIG. 14 is an isometric exploded view of a display device 50. FIG. 15 is an isometric view of the display device 50 of FIG. 14. FIG. 16 is a cross sectional view taken along XVI-XVI line of FIG. 15. A different between the display device 50 and the display device 10 of the first embodiment is that a main portion 522 of an image compensation element 52 including a light incident surface 5220 corresponding to a main display region 510 and a periphery display region 512, a light incident surface 5222 parallel to the light emitting surface 5222, a plurality of emitting surfaces 5224 interconnecting the light emitting surface 5222 and the light incident surface 5220, a plurality of support portions 523 supporting the inclined surfaces 5224, and a plurality of light guiding channels 5226 independent from each other. The main portion 522 of the image compensation element 52 is substantially a frusta rectangular pyramid and covers not only a periphery display region 512 but also a main display region 510. An area of the light emitting surface 5222 is greater than an area of the light incident surface 5220. Each light guiding channel 5226 extends from the light incident surface 5220 to the light emitting surface 5222. A section area of the light guiding channel 5226 increases from the light incident surface 5220 to the light emitting surface 5222, such that a light beam introduced into the light incident surface 5220 is transmitted and expanded to the light emitting surface 5222, thus an image of a display panel 51 is expanded. Each of the light guiding channels 5226 may be constructed by light guiding fiber 1228 of FIG. 5.

In this embodiment, a projection of the light emitting surface 5222 on the light incident surface 5220 covers the display region 511 and the non-display region 514, thus the image of the display panel 51 is expanded to cover the non-display region 514. So the non-display region 514 is invisible to a viewer, and the display device 50 has a frame-less effect. In addition, the main portion 522 and the support portion 523 are joined together to form a cover plate covering the display panel 51. A jointing gap is invisible to a viewer so a display effect of the display device 50 is better than the display effect of the display device 40 of the fourth embodiment.

Figure 17:
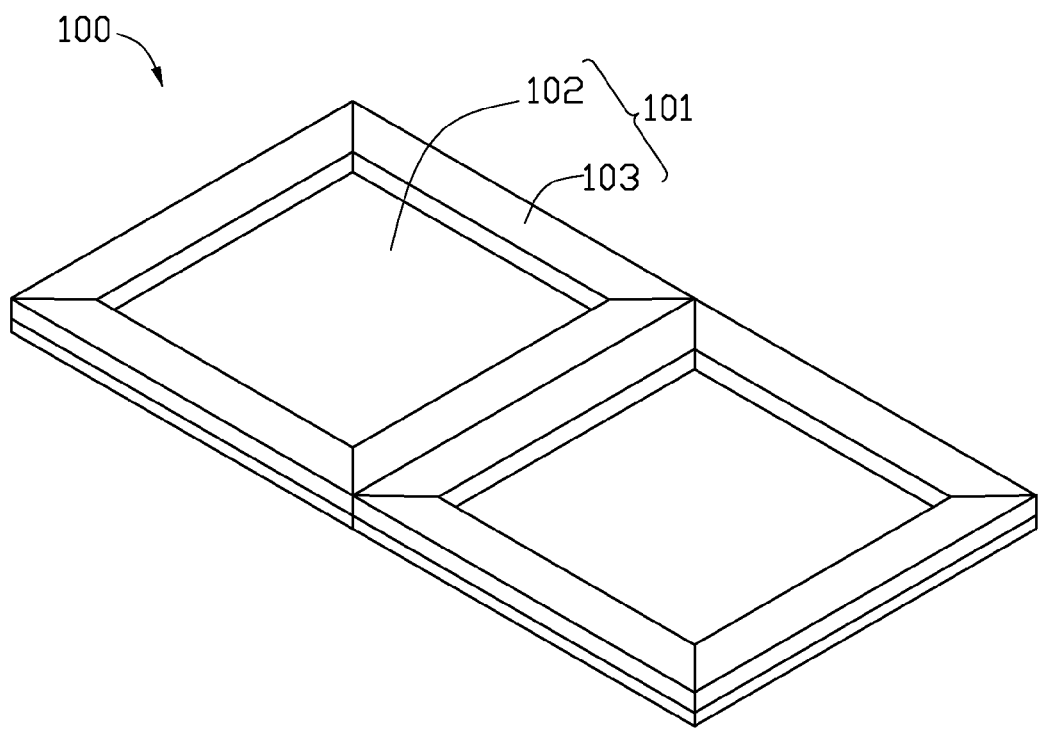
FIG. 17 is an isometric view of a first embodiment of a joint display of the present disclosure.

FIG. 17 is an isometric view of a first embodiment of a joint display 100. The joint display 100 includes two display devices 101 joined together. The display device 101 includes a display panel 102 and an image compensation element 103. The display device 101 is the same as the display device 10 of the first embodiment, or display device 30 of the third embodiment.

In this embodiment, the image compensation element 103 amplifying the image of the display panel 102, a gap between two adjacent display devices 101 is invisible. In this way, a frame-less effect is realized and the display effect of the joint display 100 is enhanced.

Figure 18:
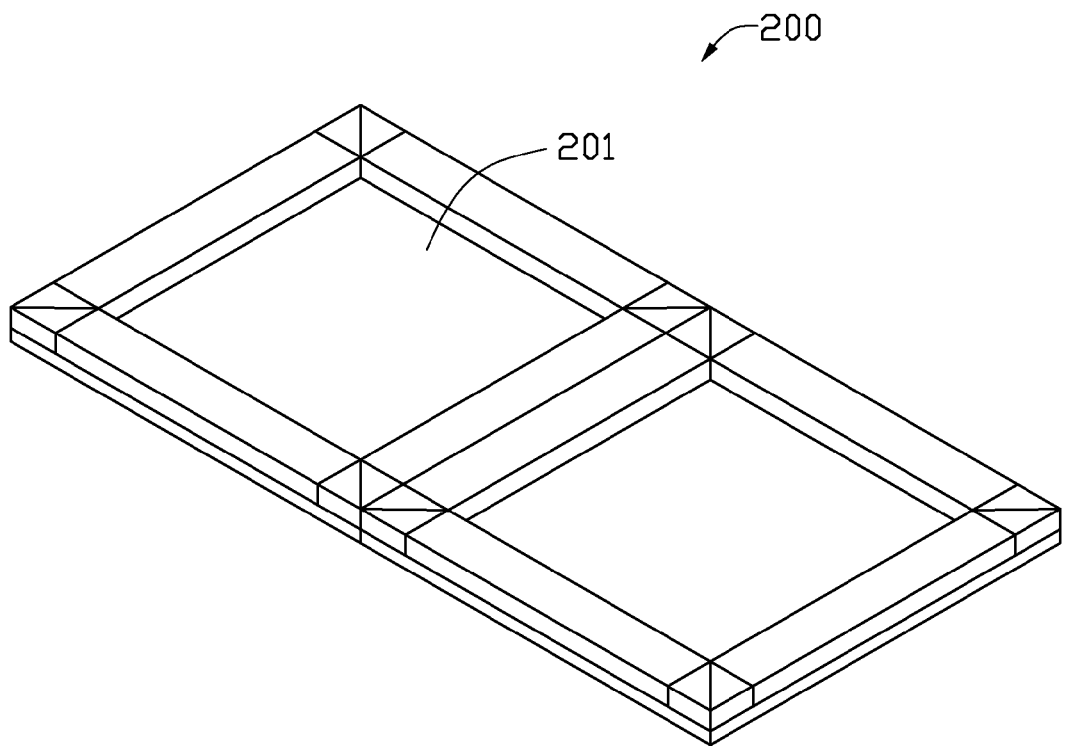
FIG. 18 is an isometric view of a second embodiment of a joint display of the present disclosure.

FIG. 18 is an isometric view of a second embodiment of a joint display 200. A different between the joint display 200 and the joint display 100 of the first embodiment is that the joint display 200 includes two display devices 201 joined together, and the display devices 201 is same as the display device 20 of the second embodiment.

Figure 19:
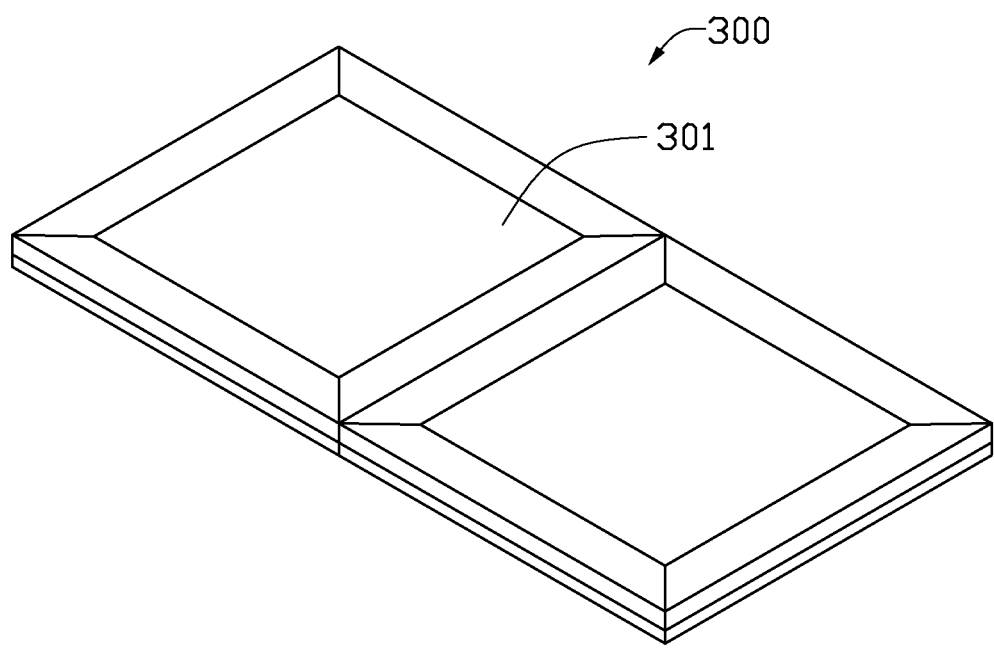
FIG. 19 is an isometric view of a third embodiment of a joint display of the present disclosure.

FIG. 19 is an isometric view of a third embodiment of a joint display 300. A different between the joint display 300 and the joint display 100 of the first embodiment is that the joint display 300 includes two display devices 301 joined together, and the display devices 301 is same as the display device 40 of the fourth embodiment.

Figure 20:
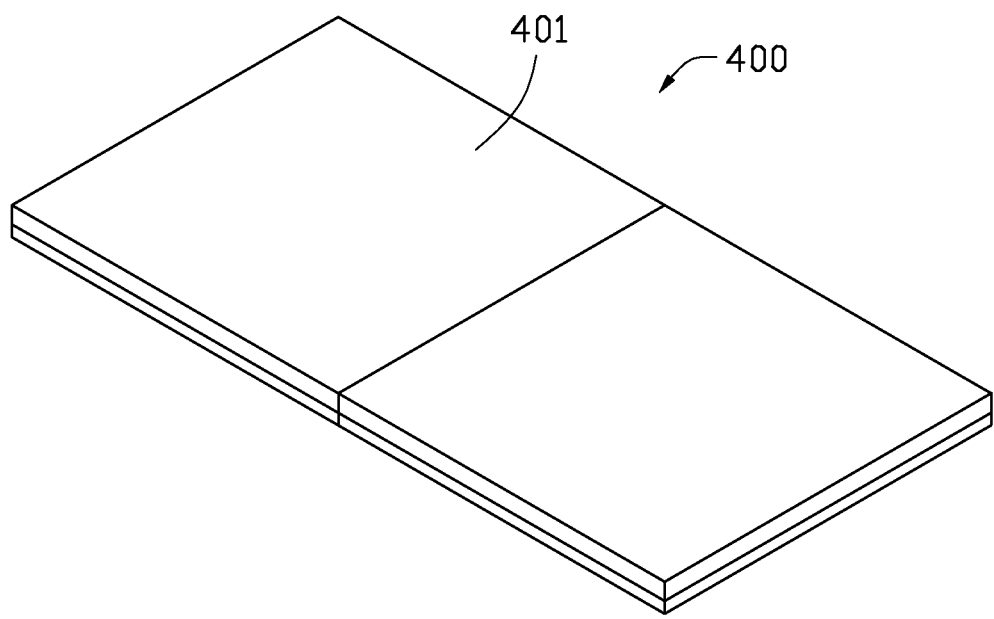
FIG. 20 is an isometric view of a fourth embodiment of a joint display of the present disclosure.

FIG. 20 is an isometric view of a fourth embodiment of a joint display 400. A different between the joint display 400 and the joint display 100 of the first embodiment is that the joint display 400 includes two display devices 401 joined together, and the display devices 401 is same as the display device 50 of the fifth embodiment.

Figure 21:
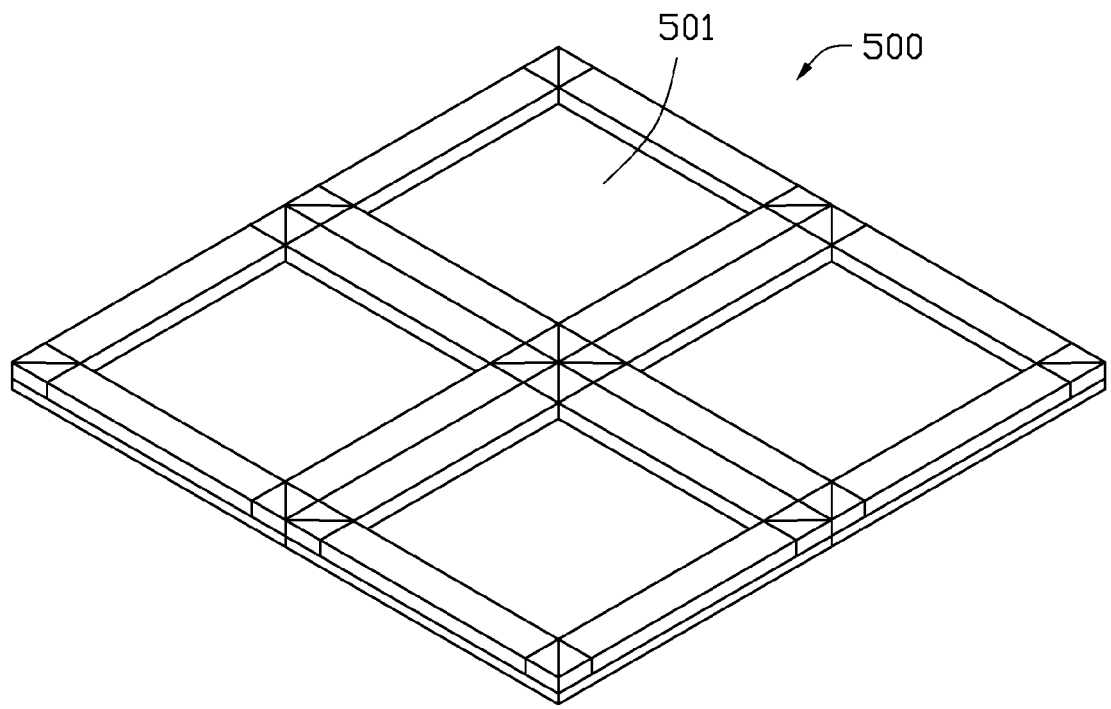
FIG. 21 is an isometric view of a fifth embodiment of a joint display of the present disclosure.

FIG. 21 is an isometric view of a fifth embodiment of a joint display 500. The joint display 500 includes four display devices 501 joined together, and the display device 501 is preferred same as the display device 20 of the second embodiment. It can be understood that the display device may be same as display device 10 of the first embodiment, display device 30 of the third embodiment, display device 40 of the fourth embodiment, or display device 50 of the fifth embodiment.

Figure 22:
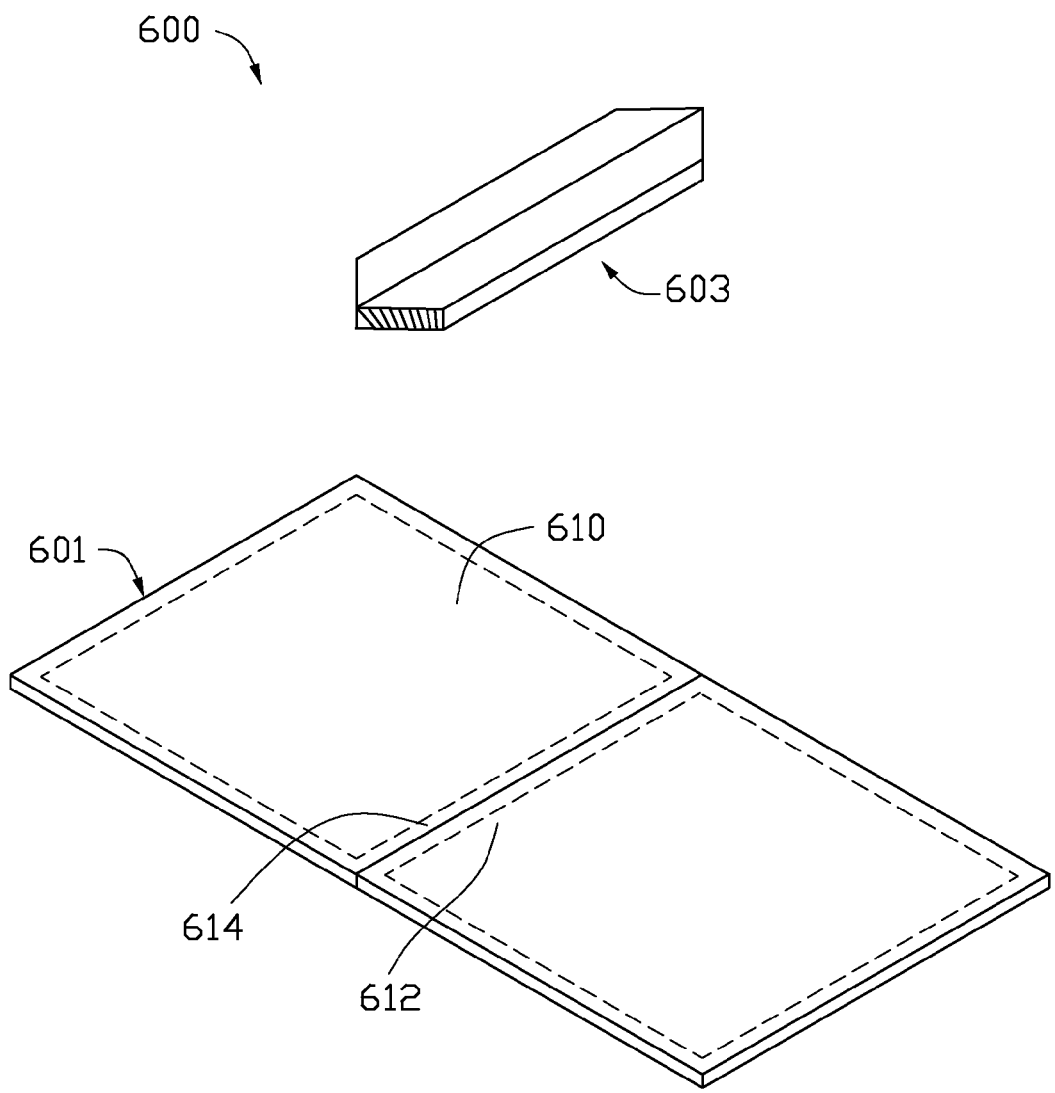
FIG. 22 is an isometric exploded view of a sixth embodiment of a joint display of the present disclosure.
Figure 23:
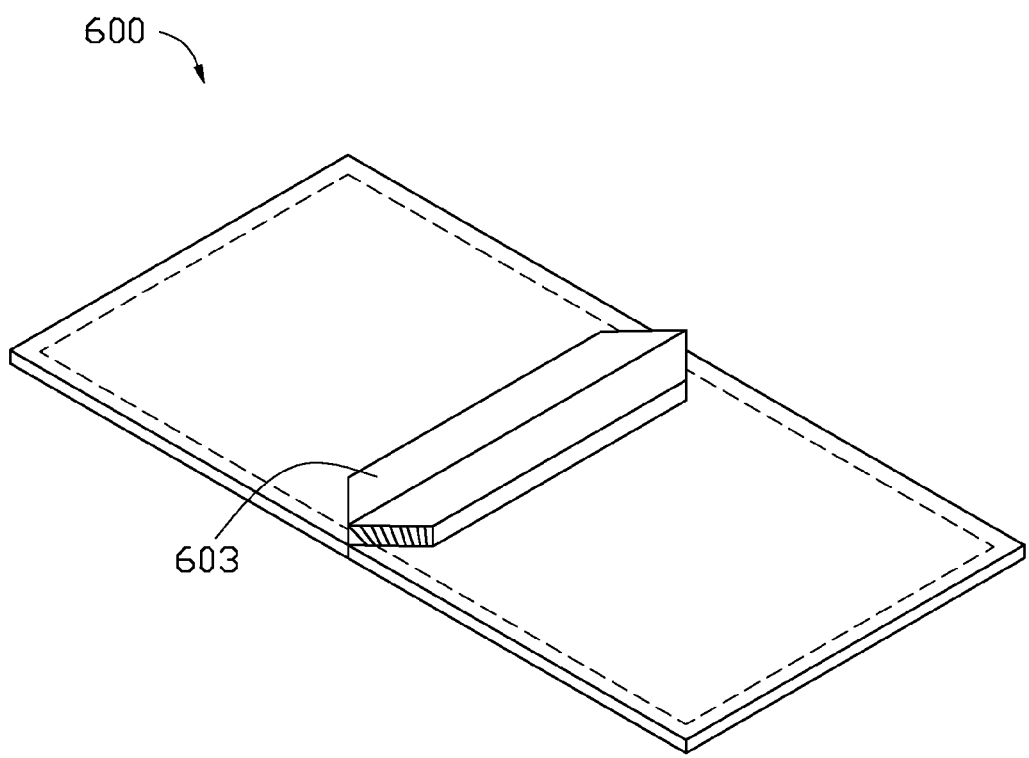
FIG. 23 is an isometric view of the joint display of FIG. 22.

FIG. 23 is an isometric view of a sixth embodiment of a joint display 600. FIG. 22 is an isometric exploded view of the joint display 600 of FIG. 23. The joint display 600 is similar to the first embodiment of the joint display 100. A different between the joint display 600 and the first embodiment of the joint display 100 is that the image compensation element 603 just placed on a periphery display region 612 and a non-display region 614 between a main display region 610 of two adjacent display devices 601. The structure and location of the image compensation element 603 is same as the image compensation element 12 of the first embodiment. An image of the periphery display region 612 is amplified by the image compensation element 603 to accomplish no black-edge splice of the joint display 600.

Figure 24:
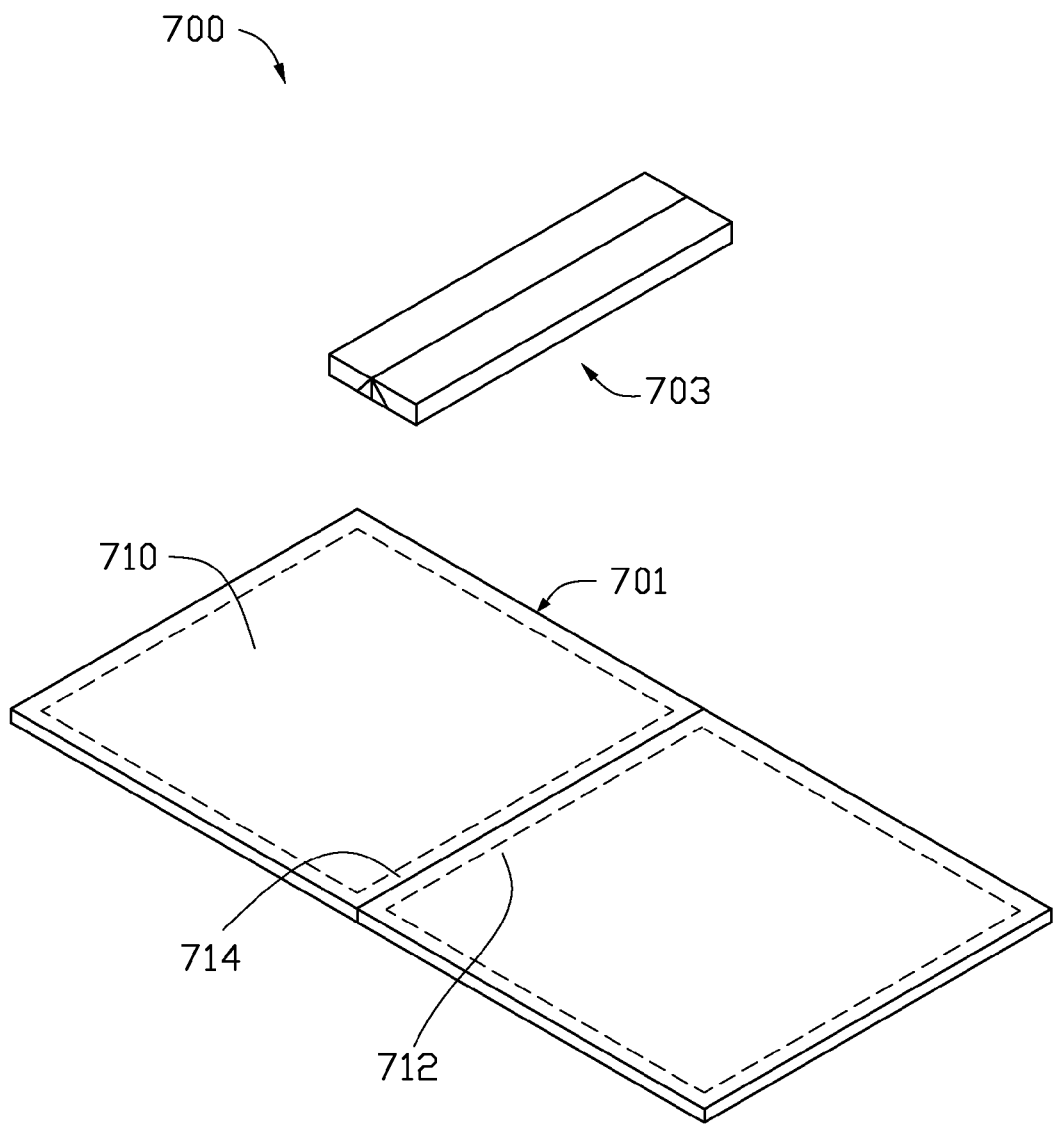
FIG. 24 is an isometric exploded view of a seventh embodiment of a joint display of the present disclosure.
Figure 25:
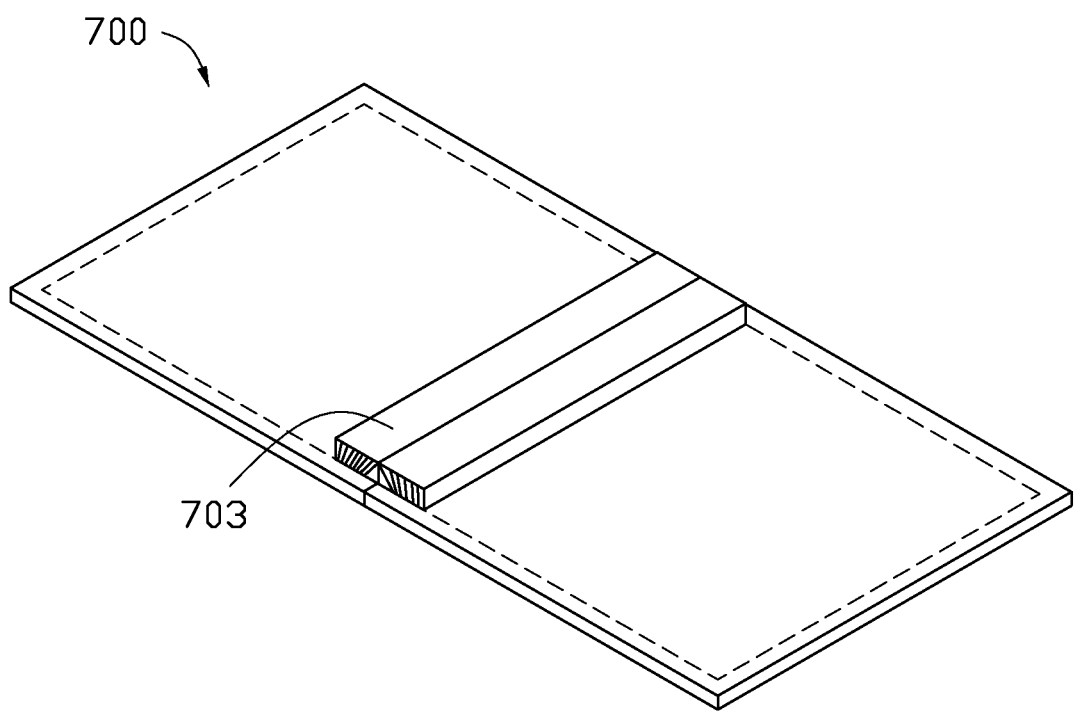
FIG. 25 is an isometric view of the joint display of FIG. 24.

FIG. 25 is an isometric view of a seventh embodiment of a joint display 700. FIG. 24 is an isometric exploded view of the joint display 700 of FIG. 25. The joint display 700 is similar to the second embodiment of the joint display 200. A different between the joint display 700 and the second embodiment of the joint display 200 is that the joint display 700 includes an image compensation element 603 just placed on a periphery display region 712 and a non-display region 714 between the main display regions 710 of two adjacent display devices 701. The structure and location of the image compensation element 703 is same as the image compensation element 22a of the second embodiment. An image of the periphery display region 712 is amplified by the image compensation element 703 to accomplish no black-edge splice of the joint display 700.

The angels and sizes of above described image compensation elements may be changed according to a design requirement. The angels and sizes of the image compensation elements shown in the present invention is merely for illustrating, not for limiting, one skilled in the prior can easily understand.

It is to be understood that even though numerous characteristics and advantages of the present embodiments have been set forth in the foregoing description, together with details of the structures and functions of the embodiments, the disclosure is illustrative only; and that changes may be made in detail, especially in matters of shape, size, and arrangement of parts, within the principles of the embodiments, to the full extent indicated by the broad general meaning of the terms in which the appended claims are expressed

What is claimed is:

1. An image compensation element, comprising:
a plurality of light guiding channels forming a main portion, with:
the main portion having a light incident surface and a light emitting surface, the light emitting surface opposite to, and substantially parallel to, the light incident surface;
the plurality of light guiding channels arranged independently from each other to transmit light from the light incident surface to the light emitting surface; and
each light guiding channel having a first end closer to the main portion light incident surface and a second end closer to the light emitting end;
wherein, the light emitting surface of the main portion is larger than the light incident area of the main portion; and
wherein, a cross-sectional area of each of the plurality of light guiding channels increases from the first end of the light guiding channel to the second end of the light guiding channel, the main portion further comprises an inclined surface interconnecting the light incident surface and the light emitting surface included with the light incident surface by a predetermined angle, and a detachable supporting portion is located at and contacting the inclined surface of the main portion.

2. The image compensation element of claim 1, wherein each of the plurality of light guiding channels comprises a light guiding fiber extending from the light incident surface to the light emitting surface, and the section area of the light guiding fiber increases from the light incident surface to the light emitting surface.

3. The image compensation element of claim 1, wherein a ratio of the area of each light guiding channel at the side of the light emitting surface to the area at the side of the light incident surface is between 1.69 and 4.

4. The image compensation element of claim 1, further comprising a side surface interconnecting the light incident surface and the light emitting surface and opposite to the inclined surface, wherein a ratio of the area of each light guiding channel on the light emitting surface to the area of the same light guiding channel on the light incident surface substantially increases along a direction from the connecting surface to the inclined surface.

5. The image compensation element of claim 1, wherein an angle included by the inclined surface and the light incident surface is an obtuse angle.

6. The image compensation element of claim 1, wherein a height of the support portion is equal to the height of the main portion, and a bottom surface of the support portion is coplanar to the light incident surface.

7. A display device, comprising:
a display panel comprising a main display region and a periphery display region surrounding the main display region;
an image compensation element including a main portion disposed over the display panel corresponding to the periphery display region, the main portion having a light incident surface, a parallel light emitting surface, and a plurality of light guiding channels independently arranged from each other for light transmission therethrough; and
wherein the section area of each light guiding channel gradually increases from the light incident surface to the light emitting surface, and a projection area of the light emitting surface on the light incident surface is greater than an area of the light incident surface.

8. The display device of claim 7, wherein each light guiding channel is defined by a light guiding fiber extending from the light incident surface to the light emitting surface.

9. The display device of claim 7, wherein a ratio of the area of each light guiding channel at the side of the light emitting surface to the area at the side of light incident surface is between 1.69 and 4.

10. The display device of claim 7, wherein the main portion has an inclined surface interconnecting the light emitting surface and the light incident surface, and included with the light incident surface by an obtuse angle.

11. The display device of claim 10, wherein the main portion has a side surface interconnecting the light incident surface and the light emitting surface and opposite to the inclined surface, and a ratio of the area of each light guiding channel on the light emitting surface to the area of the light guiding channel on the light incident surface increases along a direction from the side surface to the inclined surface.

12. The display device of claim 7, wherein the display panel comprises a non-display region surrounding to the periphery display region, the image compensation element expands the image provided from the periphery display region to cover an area over the non-display region.

13. A joint display, comprising
at least two display devices joining with each other, each of the display device comprising a display panel and an image compensation element, the display panel comprising a main display region and a periphery display region located at least one side of the main display region;
wherein the image compensation element includes a main portion disposed over the display panel corresponding to the periphery display region, the main portion has a light incident surface, a parallel light emitting surface, and a plurality light guiding channels independently arranged from each other for light transmission therethrough; and
wherein the section area of each light guiding channel gradually increases from the light incident surface to the light emitting surface, and the projection of the light emitting surface on the light incident surface is greater than an area of the light incident surface, such that the main portion expands an image provided from the periphery display region to one side thereof opposite to the main display region.

14. The joint display of claim 13, wherein each of the plurality of light guiding channels comprises a light guiding fiber extending from the light incident surface to the light emitting surface, and the section area of the light guiding fiber increases from the light incident surface to the light emitting surface.

15. The joint display of claim 13, wherein a ratio of the area of each light guiding channel at the side of light emitting surface to the area at the side of the light incident surface is between 1.69 and 4.

16. The joint display of claim 13, wherein a ratio of the diameter of each light guiding channel at the side of light emitting surface to the diameter at the side of light incident surface is between 1.3 and 2.

17. The joint display of claim 13, wherein the main portion has an inclined surface interconnecting the light incident surface and the light emitting surface, and included with the light incident surface by an obtuse angle.

18. The joint display of claim 17, wherein the main portion has a side surface connecting between the light incident surface and the light emitting surface and opposite to the inclined surface, and the connecting surface is perpendicular to the light incident surface and the light emitting surface.

* * * * *